J. MENSEN.
SEPARATOR.
APPLICATION FILED JULY 8, 1910.
978,920.
Patented Dec. 20, 1910.
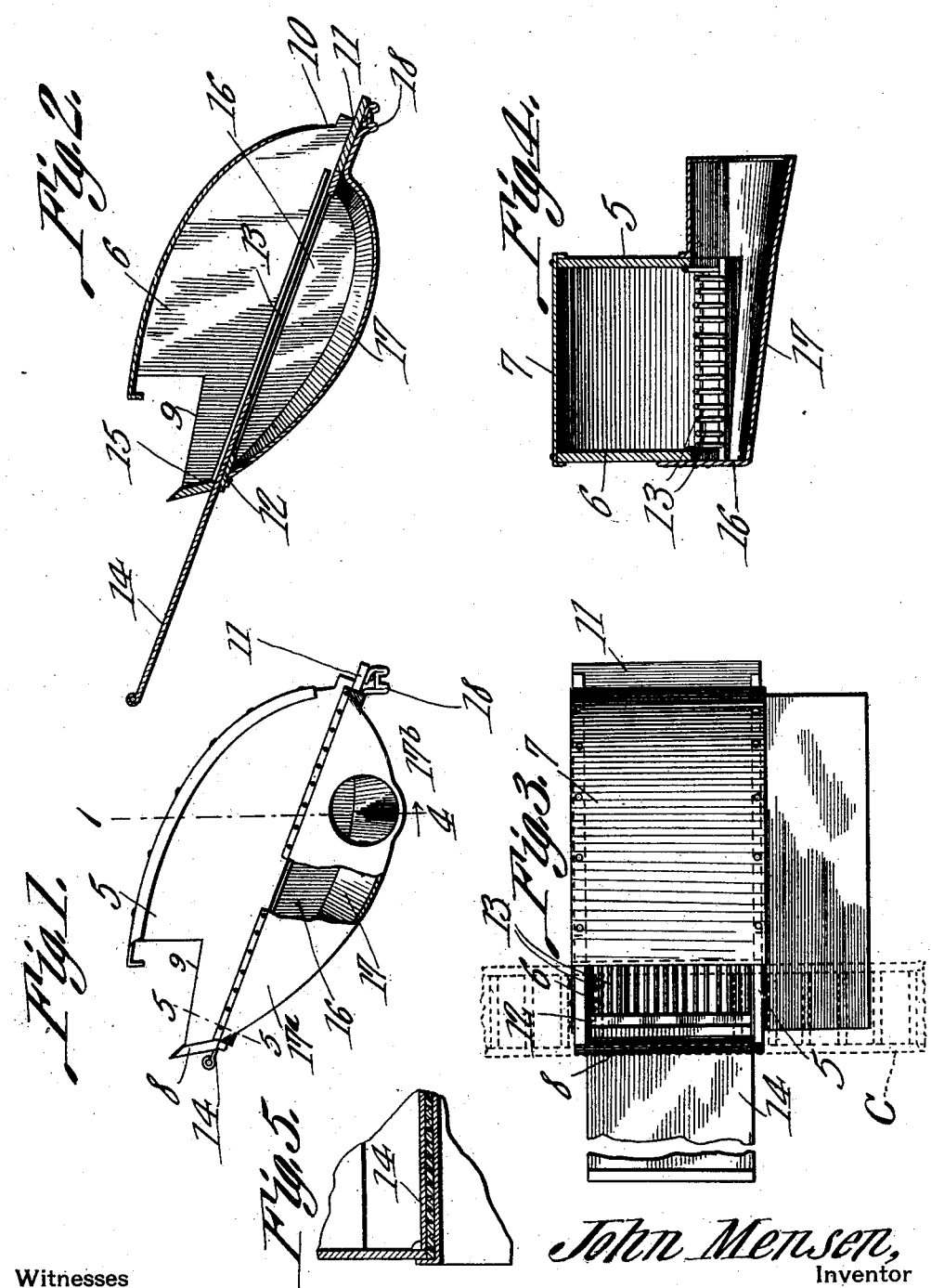
John Mensen,
Inventor
by C. A. Snow & Co.
Attorneys
Witnesses

UNITED STATES PATENT OFFICE.

JOHN MENSEN, OF REMSEN, IOWA.

SEPARATOR.

978,920.  Specification of Letters Patent.  Patented Dec. 20, 1910.

Application filed July 8, 1910. Serial No. 571,016.

*To all whom it may concern:*

Be it known that I, JOHN MENSEN, a citizen of the United States, residing at Remsen, in the county of Plymouth and State of Iowa, have invented a new and useful Separator, of which the following is a specification.

It is the object of the present invention to provide an improved separator for use in connection with corn conveyers, the aim of the invention being to provide a device of this class which will automatically separate the grain from the ear corn, before the same is deposited in the crib.

Briefly stated, the invention resides in a casing the bottom of which is in the nature of a screen of such size as to permit of the passage of loose grains of corn but to prevent the passage of ears of corn and this casing has an inlet end and a discharge end, it being arranged at its latter end for disposal above one side wall of a crib so that the corn thrown into the casing at its open or inlet end will be separated, the grain from the ear, and the ear corn will be allowed to pass through the discharge end of the casing and fall into the crib. The loose or grain corn, dropping through the grate bottom of the casing, falls into an inclined spout from which it may be readily removed as soon as a quantity has accumulated.

With the above and other objects in view, the invention consists in the construction and arrangement of parts substantially as described and claimed.

Figure 1 is a view in side elevation with parts broken away of the device embodying the present invention. Fig. 2 is a vertical longitudinal sectional view therethrough. Fig. 3 is a top plan view of the device, a slide for closing or covering the screen of the device, being shown partly withdrawn. Fig. 4 is a vertical sectional view on the line 4—4 of Fig. 1, looking in the direction indicated by the arrow. Fig. 5 is a sectional view on the line 5—5 of Fig. 1.

In the drawings, the device is illustrated as embodying in its casing structure, spaced walls of which the front one is indicated by the numeral 5 and the rear one by the numeral 6. A top wall 7 is secured at its edges to the upper edges of the walls 5 and 6 and while this said top wall is illustrated at 7 in the drawings as convex, it may be flat if desired. At its end opposite its end which is adapted for disposal upon one side board of a crib in connection with which the separator is used, the casing of the separator has a shallow transverse wall 8 and it will be observed that between this wall and the adjacent end of the top wall 7, the front and rear walls 5 and 6, respectively, are cut away as indicated by the numeral 9 so that an opening is afforded at this end of the casing, through which opening the ear and grain corn to be separated may be introduced into the casing. It will also be observed that at its opposite end, the wall 7 terminates short of the screen bottom of the casing so as to afford an outlet or discharge opening 10 through which the ear of corn passes immediately before dropping in the crib.

The screen of the casing is illustrated as including in its structure transverse frame boards of which one is indicated by the numeral 11, it being located at the discharge end of the casing, and the other indicated by the numeral 12 and located at the inlet end of the casing. Screen bars or rods indicated by the numeral 13 are secured at their ends to the opposing edges of these boards 11 and 12 and extend lengthwise of the casing between the said boards and in such spaced relation as to permit of grains of corn falling therebetween but not so spaced as to permit of the passage therebetween of the ear.

A slide 14 is fitted slidably through a slot 15 in the wall 8 of the casing and may be slid into position to overlie the screen bars 13 or may be partly or wholly withdrawn as in Figs. 2 and 3 of the drawings to expose these screen bars, it being understood that in the former instance, the device will not perform a separating operation, but will merely allow of discharge of the ear and grain corn into the crib. In the latter instance, however, that is to say when the slide is wholly or partly withdrawn, the ears will roll over the screen bars and through the discharge end 10 of the casing and into the crib whereas the loose grains of corn will fall between these screen bars.

In order that the loose grains of corn falling between the screen bars, may be collected and thus saved, there is provided, beneath the screen of the casing, a bottom which will now be specifically described. This bottom is preferably formed from sheet metal and is bent to afford a rear wall indicated by the numeral 16, which wall is in a vertical plane with the rear wall 6 of the casing of the device, a front wall 17ª in a plane with the front wall 5 of the casing, and a floor which is indicated by the numeral 17 and is secured at one side edge to the board 12 and at its other side edge to the board 11. The front wall 17ª is formed with an outlet opening 17ᵇ through which the loose grains pass. It will be observed from an inspection of the several figures of the drawings that the floor 17 is not only inclined downwardly from the rear to the front but also that it is inclined from its edge which is secured to the board 12, downwardly toward the edge which is secured to the board 11 so that while the floor is of considerable area and will receive grain falling between the screen bars 13 at any point in their lengths, the grain will tend to collect in the deeper portions of the bottom and as the floor is inclined downwardly forwardly throughout its entire length, the loose grain falling thereon will tend to roll down and discharge through the opening 17ᵇ. It will be observed that the lower edge of the bottom wall 17, or in other words that edge which is secured to the board 11 is bent to afford a channel 18 and this portion may be engaged with the upper edge of one side board of the crib in connection with which the device is used.

It will further be observed that the entire device is inclined downwardly toward the crib end.

The conveyer is illustrated in a general way in dotted lines in Fig. 1 of the drawings, as indicated by the reference character C.

What is claimed is:—

In a device of the class described, a casing having an inclined screen, the said casing having at its upper side an inlet opening and at its lower end a discharge opening located at the lower end of the said inclined screen, a slide mounted for movement over the said screen whereby to extend thereover or to expose the same, the casing having a bottom extending entirely beneath its said inclined screen, the floor of the said bottom being curved from side to side and being inclined from side to side and from front to rear, the said bottom including a front wall formed with a discharge opening located at the lowermost portion of the said floor.

In testimony that I claim the foregoing as my own, I have hereto affixed my signature in the presence of two witnesses.

JOHN MENSEN.

Witnesses:
M. A. MIERAS,
A. P. LICOTT.